3,517,077
PROCESS FOR PRODUCING BENZENE BY THE HYDRODEALKYLATION OF CUMENE BOTTOMS
Massimo Simonetta, Milan, Italy, assignor to Societa Italiana Resine S.p.A., Milan, Italy, an Italian joint-stock company
No Drawing. Filed Sept. 13, 1968, Ser. No. 759,797
Claims priority, application Italy, Sept. 20, 1967, 20,653-A/67, Patent 811,814
Int. Cl. C07c 3/00, 3/58
U.S. Cl. 260—672     3 Claims

ABSTRACT OF THE DISCLOSURE

A process for producing benzene, methane, and ethane by thermal dealkylation in the presence of hydrogen, at elevated temperature and pressure, comprising feeding to a dealkylation reactor a cumene bottoms product obtained from a cumene synthesis product resulting from the reaction of benzene and propylene, supplying hydrogen to the reactor in an amount whereby the molar ratio of hydrogen to the said bottoms product, reckoned as di-isopropylbenzene is from 6:1 to 20:1, operating the reactor at a temperature of from 600° C. to 800° C. and at a pressure of from 30 to 70 atm., with a contact time of from 0.5 to 50 seconds, recovering benzene from the normally liquid reaction products obtained from the reactor, and recovering methane and ethane from the normally gaseous reaction products obtained from the reactor.

CROSS-REFERENCE TO RELATED APPLICATION

Reference is made to copending application Ser. No. 759,799, filed Sept. 13, 1968, by the same inventor as the present application.

The invention relates to the preparation of hydrocarbons.

In the process of the invention benzene, methane and ethane are prepared by thermal hydrodealkylation of the hydrocarbon mixtures, chiefly composed of di-isopropylbenzenes, which are the side products in the catalytic synthesis of cumene and are obtained as bottom products in the distillation of cumene.

The process, which is carried out at high temperatures and pressures in the absence of solid substances having a catalytic action on the reaction, is advantageous first of all in that the feed comprises substances available at low price. The process of the invention moreover is distinguished by high hydrodealkylation speeds so that good conversions are reached within relatively short periods of time. Moreover, the reaction progresses in a highly selective manner, so that liquid reaction products are obtained which consist substantially of benzene alone, whereas the gaseous products comprise methane with smaller quantities of ethane.

This result is all the more surprising considering the complexity of the hydrocarbons in the feed, which normally comprise 80 to 85% di-isopropylbenzenes, the remaining portion being a complex mixture of about 40 heavy products, as may be ascertained by gas chromatographic analysis.

Moreover, the process of the invention avoids the formation of polycyclic hydrocarbons, as well as the formation of coke, when operating within the limits defined hereafter.

In operating the process of the invention tubular reactors are preferably employed, to the bottom of which the hydrocarbon mixtures and at least part of the hydrogen are fed. In order to check the thermal effects of the reaction, part of the hydrogen may be fed at lower temperatures laterally over the reactor body.

The reaction temperatures preferably range between 600 and 800° C. The reaction pressure is preferably 30 to 70 atm.

Pure hydrogen or a gas containing, preferably, over 70% hydrogen may be employed, the molar ratio of hydrogen to hydrocarbon (calculated as di-isopropylbenzene) preferably being between 6:1 and 20:1.

The dwell periods are preferably 0.5 to 50 sec., advantageously 1.0 to 30 sec.

The invention is illustrated by the following example.

EXAMPLE

A reactor made of a nickel alloy, of tubular shape, 12 mm. in diameter and 50 ml. in effective volume, is employed.

The reactor is provided with thermocouples for measuring temperature, means for admitting and pre-heating the reagents and means for cooling and recovering the liquid reaction products.

The hydrocarbon feed charge comprises the side products of a cumene synthesis reaction from propylene and benzene, of the following composition by weight as determined by gas-chromatographic analysis:

|  | Percent |
|---|---|
| p-Di-isopropylbenzene | 43.1 |
| m-Di-isopropylbenzene | 28.0 |
| o-Di-isopropylbenzene | 11.7 |
| Light products | 0.5 |
| Heavy products | 16.6 |

The hydrocarbon mixture is fed at 28.0 ml. per hour, the hydrogen being fed at a rate of 68.5 litres per hour, the measurements being effected at room temperature.

A total pressure of 40 atm. is maintained in the reactor, the reaction temperature being 720° C.

By cooling the reaction products 14 ml./h. of a liquid product are obtained, of the following composition by weight, as determined by gas-chromatographic analysis:

|  | Percent |
|---|---|
| Benzene | 99.3 |
| Toluene | 0.4 |
| Xylol | 0.3 |

The analysis of the gaseous products, including unreacted hydrogen, showed the following average composition, given in mol percent:

|  | Percent |
|---|---|
| Hydrogen | 75.0 |
| Methane | 16.7 |
| Ethane | 8.3 |

Propane traces.

I claim:
1. A process for producing benzene, methane and ethane by the thermal dealkylation of a cumene synthesis bottoms product, in the presence of hydrogen, at elevated temperature and pressure in the absence of catalytic substances, said process comprising:
   (a) supplying to a dealkylation reactor a bottoms product obtained from the distillation of cumene in a cumene-synthesis product resulting from the reaction of benzene and propylene, said bottoms product consisting essentially of di-isopropylbenzenes;
   (b) supplying hydrogen to said reactor in an amount whereby the molar ratio of said hydrogen to the said bottoms product, reckoned as di-isopropylbenzene, is from 8:1 to 20:1;
   (c) operating said reactor at a temperature of from 600° C. to 800° C. and at a pressure of from 30 to 70 atm., with a contact time of from 0.5 second to 50 seconds;

(d) recovering benzene from the normally liquid reaction products obtained from said reactor; and
(e) recovering methane and ethane from the normally gaseous reaction products obtained from said reactor.

2. Process as claimed in claim 1, in which the reaction time is 1.0 to 30 sec.

3. Process as claimed in claim 1, in which the source of hydrogen is selected from pure hydrogen and a gas containing over 70% hydrogen.

References Cited

UNITED STATES PATENTS

| | | | |
|---|---|---|---|
| 3,171,862 | 3/1965 | Larkins et al. | 260—672 |
| 3,178,485 | 4/1965 | Myers | 260—672 |
| 3,296,323 | 1/1967 | Myers et al. | 260—672 |
| 2,768,219 | 10/1956 | Hoffman et al. | 260—672 |
| 3,293,308 | 12/1966 | Vol-Epstein | 260—668 X |
| 3,184,517 | 5/1965 | Lee et al. | 260—671 |
| 2,211,524 | 8/1940 | Stanley et al. | 260—672 |
| 2,924,569 | 2/1960 | Souby | 208—107 |
| 3,213,150 | 10/1965 | Cabbage | 260—667 |

FOREIGN PATENTS 1,111,763  5/1968  Great Britain.

OTHER REFERENCES

Fowle & Pitts; "Thermal Hydrodealkylation," Chem. Eng. Progress 58 (4) 37–40 (April 1962).

DELBERT E. GANTZ, Primary Examiner

GEORGE E. SCHMITKONS, Assistant Examiner